(No Model.)
A. RÖSLE.
GEAR CUTTING APPARATUS.
No. 545,913. Patented Sept. 10, 1895.
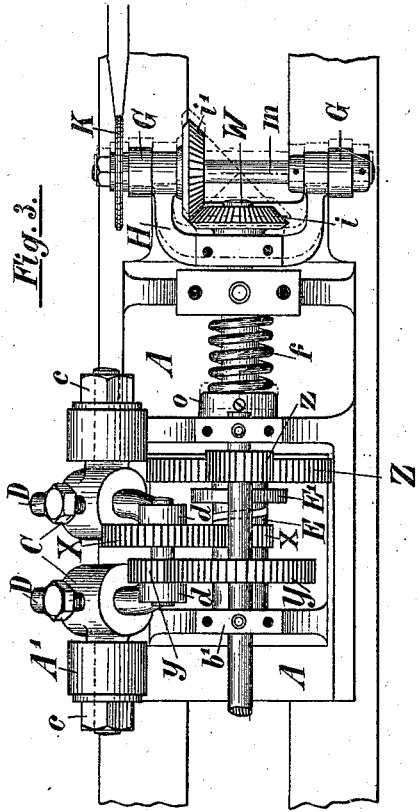
Witnesses:
M. C. Massie
A. J. Birney
Inventor:
Adolf Rösle
by Max Georgii
his Attorney.

UNITED STATES PATENT OFFICE.

ADOLF RÖSLE, OF HEIDENHEIM, GERMANY.

GEAR-CUTTING APPARATUS.

SPECIFICATION forming part of Letters Patent No. 545,913, dated September 10, 1895.

Application filed November 19, 1894. Serial No. 529,308. (No model.)

*To all whom it may concern:*

Be it known that I, ADOLF RÖSLE, engineer, of Heidenheim, Würtemberg, Germany, have invented a new and useful Gear-Cutting Apparatus, of which the following is a specification.

The object of this invention is to produce a simple apparatus by means of which the cutting-teeth of straight and circular cutters or saws of any desired form, size, or number of teeth may be given clearance. The apparatus may be substituted for the spindle-stock of a lathe, or it may be placed at any other position upon the lathe-shears and the turning be done by means of the ordinary turning devices of the lathe, or the apparatus may be placed upon a suitable frame with a turning apparatus attached, so that the device may be an independent machine.

The device itself is shown in the accompanying drawings, in which—

Figure 1 is a vertical longitudinal section. Fig. 2 is a vertical cross-section, and Fig. 3 is a plan. Figs. 4 and 5, drawn to a larger scale, show the arrangement for producing the axial sliding of the spindle or the cross-shaft upon which the cutter, saw, &c., are secured; and Figs. 6 and 7 show an arrangement for operating on spur-cutters.

In the drawings is shown a circular cutter K, having fifteen teeth $k$, each of which is to be "cleared." The cutter K is secured upon the cross-shaft $m$, which is itself carried in the movable yoke H, with the sliding spindle W, the yoke H, being carried by the levers G, which turn upon the bearings $A^2$ of the support A. The rotation of the cross-shaft $m$ is produced by means of the two equal conical gears $i$ and $i'$ from the spindle W by means of the spur-wheels $z$ and Z from the driving-shaft P. The spindle W is slidably carried in the bearings $a$ and $b$ of the supports $A^3$ and B. The spindle W obtains its sliding movement by means of a cam-disk E', located thereon, the cam of which strikes against a second cam-disk E, which is loose upon spindle W, but is incapable of sliding, and which is rotated by means of the gear $x$, secured thereto. The gear $x$ meshes with a change-gear X, which is located upon the small shaft $d$, upon which there is also located a second change-gear $y$, which meshes with a gear-wheel Y upon the driving-shaft P. The driving-shaft P is supported in bearings $a'$ and $b'$ of the supports A and B.

For one revolution of the driving-shaft P the spindle W makes $\frac{z}{Z}$ revolutions, and the cam-gear $x$, which turns in an opposite direction, makes $\frac{Y}{y} \times \frac{X}{x}$ revolutions. If the ratio of the number of teeth of Z to $z$ is as three to one, of Y to $y$ as 2.5 to one, and of X to $x$ as two to one, the cam-gear $x$ will make $\frac{3}{1} \times \frac{2.5}{1} \times \frac{2}{1}$ which equals fifteen revolutions, while the spindle W makes one—that is, the cross-shaft $m$, upon which the cutter K is located, makes one revolution, while at the same time the spindle W, together with its support H and the cutter K, makes fifteen reciprocations. The return of the spindle after each reciprocation is produced by means of the powerful spring $f$, which at one end rests against the bearing $a$ and at the other against the adjustable collar $o$, secured to the spindle W. It is thus possible, by means of a proper application of change-gears X $x$ and Y $y$, to completely control the desired number of reciprocations of the spindle W during one revolution thereof—i. e., to produce the clearance cut for a cutter of any number of teeth uniformly. If the cam-disk E' is secured by means of the yoke $e$ engaging the notch $e'$, so that it can slide but not turn, the ratio of the change-gears $z$ and Z does not come into play, but only the product of the number of teeth of the pairs of gears Y $y$ and X $x$. For the number of teeth for these wheels assumed in the drawings (2.5 : 1 and 2 : 1) the number of reciprocations of the spindle would be reduced from fifteen to five when the cam-disk E' is made fixed. In view of this arrangement in combination with different change-gears, cutters having a lesser number of teeth can be conveniently and uniformly cleared. The clearing cut is always so made that when the cutters are reground no change of profile of the teeth will occur. For the convenient interchange of the change-gears the axle $d$ rests in bearings in two adjustable arms D, which are rotatably secured in the bearings A' of the support A by means of screws c. If it is necessary to change other gears besides the change-gears or to introduce other cam-disks than E or E', it is only necessary to loosen the support B and to remove it and the change can be made without disturbing the main support A. In turning the clearance of spur-cutters such as shown in Fig. 7 the sliding yoke H is removed, the levers G are turned down, and the cutter K, is fastened directly to the crown of the spindle W by means of a screw. Then, according to the number of cutting-teeth $k'$ of the cutter K', the appropriate change-gears are placed upon the axle $d$. Accordingly as the amount of clearance of the teeth is to be greater or less cams E or E' of corresponding heights are inserted. Finally, instead of only a single cam-disk E or cam-disk E' having only a single cam projection several cam projections equally spaced may be employed. This arrrangement is specially useful in turning the clearance of cutters or saws having a large number of teeth.

The whole apparatus is exceedingly simple and cheap, especially where it can be placed upon an ordinary lathe without special frame or support.

What I claim, and desire to secure by Letters Patent, is—

1. The combination, with a spindle, a gear wheel fixed thereon, a pair of cams loose on the spindle, and a gear pinion attached to one of said cams, of means for driving the gear wheel and pinion, substantially as set forth.

2. The combination, with a longitudinally-movable spindle, a gear wheel fixed thereon, a pair of cams loose on the spindle, a gear pinion attached to one of the cams, and a spring tending to hold the cams in contact, of means for driving the gear wheel and pinion, substantially as set forth.

3. The combination, with a spindle, a gear wheel fixed thereon, a pair of cams loose on the spindle, a gear pinion attached to one of the cams, and means for holding the other cam stationary, of mechanism for driving the gear wheel and pinion, substantially as set forth.

4. The combination, with a spindle, a gear wheel fixed thereon, a pair of cams loose on the spindle, and a gear pinion attached to one of the cams, of a driving shaft, a driving pinion mounted thereon and meshing with the gear wheel, a driving wheel also mounted thereon, and a change gearing intermediate the driving wheel and the gear pinion attached to the cam, substantially as set forth.

5. The combination, with a revoluble spindle, a yoke mounted on the spindle, a cross shaft journaled in the yoke, and a pair of bevel gears, one on the spindle, and the other on the cross shaft, of means for reciprocating the spindle, in the direction of its length substantially as set forth.

6. The combination, with a revoluble spindle, a yoke mounted on the spindle, a cross shaft journaled in the yoke, a pair of bevel gears, one on the spindle, and the other on the cross-shaft, and means for reciprocating the spindle, of a swinging lever attached to the yoke, substantially as set forth.

In testimony whereof have I signed this specification in the presence of two subscribing witnesses.

ADOLF RÖSLE.

Witnesses:
AUGUST B. DRAUTZ,
CARL HUBER.